United States Patent [19]
Reimers

[11] Patent Number: 5,882,218
[45] Date of Patent: *Mar. 16, 1999

[54] LITHIUM MANGANESE OXIDE INSERTION COMPOUNDS AND USE IN RECHARGEABLE BATTERIES

[75] Inventor: Jan Naess Reimers, Maple Ridge, Canada

[73] Assignee: NEC Moli Energy (Canada) Limited, Maple Ridge, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 625,762

[22] Filed: Mar. 29, 1996

[30] Foreign Application Priority Data

Apr. 21, 1995 [CA] Canada .................................. 2147578

[51] Int. Cl.$^6$ ...................................................... H01M 4/50
[52] U.S. Cl. ........................................ 429/224; 429/231.1
[58] Field of Search ...................................... 429/224, 218

[56] References Cited

U.S. PATENT DOCUMENTS

| | | |
|---|---|---|
| 4,302,518 | 11/1981 | Goodenough et al. . |
| 4,507,371 | 3/1985 | Thacheray et al. . |
| 5,196,279 | 3/1993 | Tarascon . |
| 5,278,000 | 1/1994 | Huang et al. . |
| 5,370,710 | 12/1994 | Nagaura et al. . |
| 5,418,090 | 5/1995 | Koksbang et al. ........................ 429/224 |
| 5,449,577 | 9/1995 | Dahn et al. . |
| 5,601,796 | 2/1997 | Frech et al. .............................. 423/599 |

FOREIGN PATENT DOCUMENTS

2251119  6/1992  United Kingdom .

WO 95/05684  2/1995  WIPO .

OTHER PUBLICATIONS

Tarascon et al., "The Spinel Phase of LiMn2O4 as a Cathode in Secondary Lithium Cells", J. Electrohem. Soc., vol. 138, No. 10, pp. 2859–2868, Nov. 1991.

Ohzuku et al., "Electrochemistry of Manganese Dioxide in Lithium Nonaqueous Cells", J. Electrochem. Soc. vol. 137, No. 3, pp. 769–775, Mar. 1990.

U. von Sacken, et al., "Rechargeable LiNiO$_2$/Carbon Cells", J. Electrochem. Soc., vol. 138, No. 8, p. 2207 (1991).

J.M. Tarascon and D. Guyomard, "Li Metal–free Rechargeable Batteries Based on Li$_{1+x}$Mn$_2$O$_4$ Cathodes (0 $\leq x \leq 1$) and Carbon Anodes", J. Electrochem. Soc., vol. 138, No. 10, p. 2864 (1991).

E. Rosen, et al., "Synthesis and electrochemistry of spinel LT–LiCoO$_2$", Solid State Ionics, 62 (1993) pp. 53–60.

*Primary Examiner*—Maria Nuzzolillo
*Assistant Examiner*—Carol Chaney
*Attorney, Agent, or Firm*—Synnestvedt & Lechner

[57] ABSTRACT

A novel form of the insertion compound having the formula Li$_x$Mn$_2$O$_4$ and a tetragonal crystal structure has been synthesized wherein x is a number in the range from about 1.7 to about 2.1. The insertion compound has a voltage relative to Li/Li$^+$ in the range from about 3.2 to about 3.8 V and is thus air stable. The insertion compound is useful as an electrode material for lithium ion batteries. In particular, the insertion compound can be used as a cathode additive to result in a cathode limited construction. In certain applications, this can result in improved tolerance to overdischarge.

20 Claims, 7 Drawing Sheets

LITHIUM MANGANESE OXIDE INSERTION COMPOUNDS AND USE IN RECHARGEABLE BATTERIES

FIELD OF THE INVENTION

This invention pertains to lithium manganese oxide insertion compounds and to preparation methods thereof. Additionally, it pertains to rechargeable batteries and the use of these insertion compounds as electrode materials therein. In particular, the invention pertains to nonaqueous rechargeable batteries and the use of these insertion compounds as an electrode additive therein.

BACKGROUND OF THE INVENTION

Insertion compounds can be defined as those compounds wherein an amount of an element, molecule, or other species can be inserted into the host structure of the compound and then removed again without having irreversibly altered the host structure. Thus, while the host structure may be altered by insertion of a species, the original structure is retained upon subsequent removal of the species. Generally, only minor alterations of the host structure can occur before insertion is no longer reversible. The insertion or extraction of the species beyond the reversible range often results in the compound undergoing a phase transition to become another insertion compound with a different host structure. Often the phase transition itself is reversible.

Insertion compounds have proven useful for a variety of applications such as use as ion exchangers, but they are particularly suitable for use in non-aqueous rechargeable batteries. The excellent reversibility of some of these compounds upon insertion with lithium makes such compounds very attractive for use as electrodes in lithium rechargeable batteries. Several manufacturers, including Sony Energy Tec. and AT Battery, have made non-aqueous lithium-ion type batteries commercially available wherein both the cathode and anode electrodes are lithium insertion compounds. In each case, the cathode is a lithium cobalt oxide compound and the anode is a carbonaceous material.

These commercial lithium-ion type batteries are constructed using components that may be somewhat sensitive to water vapour but are otherwise stable in air. Thus, the batteries can be assembled economically under dry air conditions at the worst. It is therefore important to choose electrode materials that are air stable. Lithiated carbonaceous material anodes are not stable in air, so batteries are usually made in a completely discharged state wherein all the lithium in the battery resides in the cathode. Preferable cathode materials therefore have the maximum possible amount of lithium inserted while still being air stable. Additionally, cathode materials preferably are chosen that allow the maximum possible amount of lithium to be reversibly removed and re-inserted, hence providing the maximum battery capacity.

Many lithium transition metal oxide compounds may be used as cathodes in lithium-ion battery products. Along with $LiCoO_2$ (used in the Sony Energy Tec. product and described in U.S. Pat. No. 4,302,518 of Goodenough), other possible compounds include $LiNiO_2$, (also described in the aforementioned U.S. Patent), $LiMn_2O_4$ (described in U.S. Pat. No. 4,507,371), and other lithium manganese oxide compounds. Since cobalt is relatively rare, $LiCoO_2$ is relatively expensive compared to the latter two compounds. Both Co and Ni containing compounds are considered to be potential cancer causing agents and are therefore subject to strict handling requirements, particularly with respect to airborne particulate levels. Lithium manganese oxides are less of a toxicity concern and are relatively inexpensive. For these reasons, such oxides would be preferred in commercial lithium-ion type batteries if other performance requirements can be maintained.

To enhance the operating capacity of lithium-ion type batteries, it has been considered desirable, where possible, to insert additional lithium into the cathode material using chemical means prior to battery construction. For example, $LiMn_2O_4$ with the spinel structure can be further lithiated reversibly up to a stoichiometry of $Li_2Mn_2O_4$ using a reaction involving LiI as described in U.S. Pat. No. 5,196,279. However, iodine compounds can be quite corrosive and this creates potential problems when contemplating such a process for large scale manufacturing. Additionally, while this $Li_2Mn_2O_4$ compound is relatively stable under ambient conditions (ie. no significant degradation noticed over several days), it is not completely stable in air.

In general, lithium transition metal oxides are not stable in air. Only if the lithium atoms are sufficiently tightly bound to the host will they not react with water vapour, oxygen, or $CO_2$ in the air. A direct measure of the binding energy of the lithium atoms in a lithium transition metal oxide is the voltage of said oxide with respect to lithium metal in a non-aqueous battery. Empirically, it has been determined in J. R. Dahn et al, J. Electrochem Soc., 138, 2207 (1991) that lithium insertion compounds are effectively air stable if the voltages of said compounds versus lithium are greater than 3.3 ±0.2 V. As shown in J. M. Tarascon et al., J. Electrochem. Soc., Vol. 138, No. 10 (1991), the aforementioned $Li_2Mn_2O_4$ compound has a voltage versus lithium of 2.97 V and thus reacts eventually with the moisture in the air to form LiOH and $LiMn_2O_4$. Thus, while it is possible to construct a lithium-ion battery in air using this compound, special handling and storage procedures are still required to minimize the accumulated reaction with air to an acceptable level in practice. Generally, it would be expected that direct exposure to an aqueous environment would result in a more serious degradation of this compound. Thus, for example, the use of $Li_2Mn_2O_4$ in an aqueous battery application seems impractical.

Insertion compounds are used as the major active ingredient in both electrodes of typical lithium ion batteries. However, insertion compounds can also be used as an additive in such batteries. U.S. Pat. No. 5,278,000 and Japanese laid-open patent application number 04-022066 both describe the use of insertion compounds as cathode additives in lithium ion batteries. The former describes the use of a conventional form of $Li_2Mn_2O_4$ to prevent overdischarge, while the latter describes the use of $Li_2CuO_2$ to improve performance on overdischarge.

SUMMARY OF THE INVENTION

A novel form of the insertion compound having the formula $Li_xMn_2O_4$ and a tetragonal crystal structure has been created wherein x is a number in the range from about 1.7 to about 2.1 and the insertion compound has a voltage relative to $Li/Li_+$ in the range from about 3.2 to about 3.8 V. When x is about 2.1, the voltage of the compound relative to $Li/Li_+$ is about 3.2 V. When x is about 1.7, the voltage of the compound relative to $Li/Li_+$ is about 3.8 V. When additional lithium is extracted electrochemically such that x is less than 1.7, the insertion compound undergoes a phase transition at about 3.8 volts versus $Li/Li_+$ to form a spinel compound having a cubic crystal structure.

A method of preparing the insertion compounds of the invention firstly comprises preparing $Li_{2.1}Mn_2O_4$ having a tetragonal crystal structure wherein the voltage of the insertion compound relative to Li/Li$_+$ is about 3.2 V. This can be accomplished by obtaining a LiMnO$_2$ compound with an orthorhombic crystal structure and also a suitable lithium source; making a mixture of the LiMnO$_2$ compound and the lithium source; and heating the mixture at a soaking temperature above 150° C. in an atmosphere substantially free of oxygen. Preferably, the ratio of the lithium salt to the LiMnO$_2$ compound in the mixture is chosen such that the total moles of lithium in the mixture is in the range from about 1.25 to about 1.45 times the moles of Mn. A means for achieving the desired atmosphere comprises flowing inert gas over the mixture during the heating.

A suitable lithium source is Li$_2$CO$_3$. In such a case, the soaking temperature can be about 1000° C. Additionally, the soaking temperature can be attained by ramping the temperature of the mixture at about 80° C./minute. Thereafter, the soaking temperature can be maintained for about 1 to 2 hours.

Other novel insertion compounds having the formula Li$_x$Mn$_2$O$_4$ wherein x is in the range from less than 2 to about 1.7 can be prepared using the novel Li$_x$Mn$_2$O$_4$ compound and electrochemically extracting lithium therefrom.

Suitable applications for the insertion compounds of the invention include their use in a rechargeable battery as a portion of the cathode material of the battery. While the insertion compounds may constitute the major fraction of the cathode, a particularly suitable application involves their use as an additive to the cathode wherein the major constituent is another lithium transition metal oxide insertion compound, in particular another lithium manganese oxide spinel insertion compound. Judicious use of the insertion compounds as an additive can result in a rechargeable battery that is cathode limited on discharge rather than anode limited. This in turn can result in improved tolerance to overdischarge and/or improved cycle life.

Lithium ion rechargeable batteries in particular can benefit from the aforementioned use as an additive. These batteries have an anode comprising a lithium insertion compound and an electrolyte comprising a lithium salt dissolved in non-aqueous solvents. Additionally, the anode of these batteries can comprise a copper current collector which can be susceptible to degradation on overdischarge in anode limited constructions.

DETAILED DESCRIPTION OF SPECIFIC EMBODIMENTS OF THE INVENTION

Figure 1:
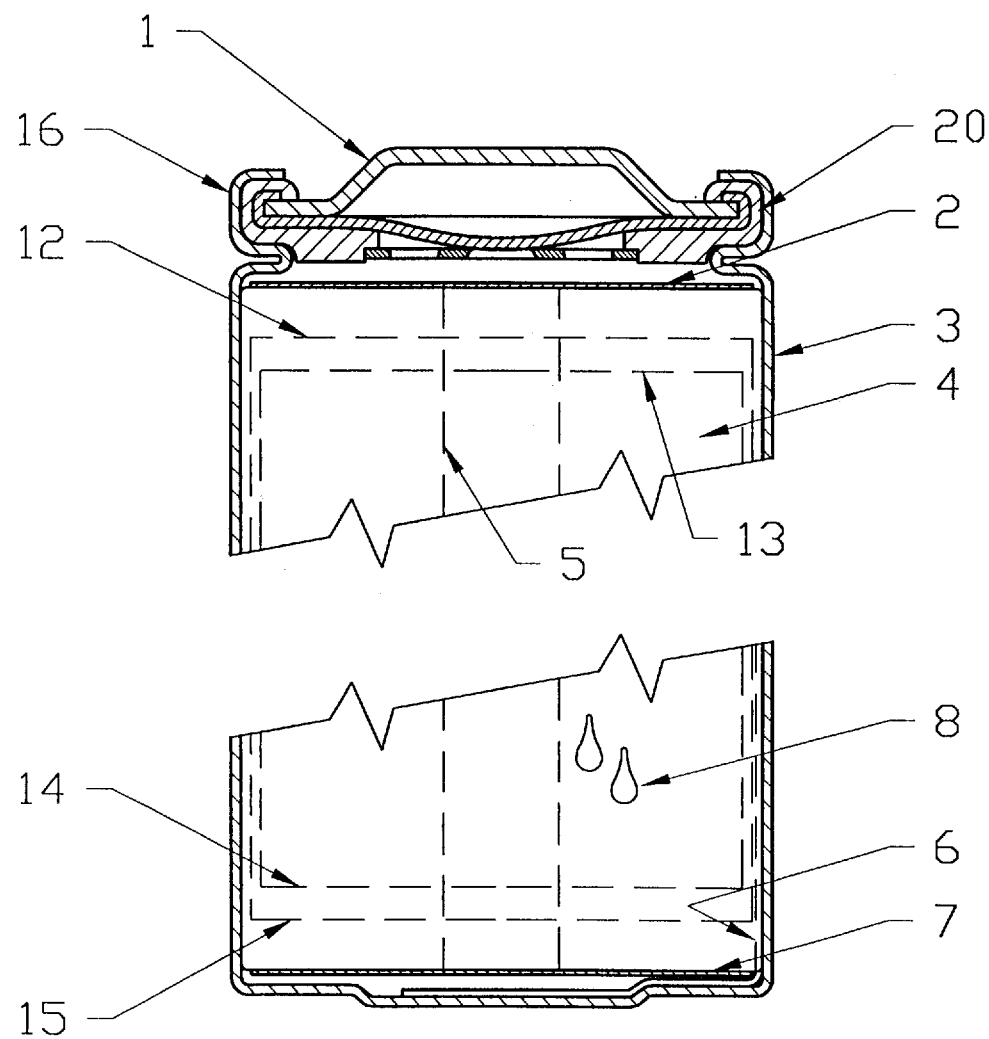
FIG. 1 depicts a cross-sectional view of a spiral-wound type lithium ion battery.

The Li$_x$Mn$_2$O$_4$ insertion compounds of the invention has a similar stoichiometry range and is characterized by the same x-ray diffraction pattern as the insertion compounds in the aforementioned U.S. Pat. No. 5,196,279. However, the instant insertion compounds differ in their voltage characteristics and hence in their stability in air. As shown in the following examples, the instant insertion compounds have a voltage relative to Li/Li$_+$ in the range from about 3.2 to about 3.8 V as x varies between about 2.1 to about 1.7. The corresponding prior art insertion compounds have a voltage relative to Li/Li$_+$ in the range from about 3 to about 3.2 V as x varies over the same range.

When additional lithium is extracted electrochemically such that x becomes less than 1.7, the insertion compound undergoes a phase transition at about 3.8 volts versus Li/Li$_+$ to form a spinel compound having a cubic crystal structure. This transition does not seem reversible. If the extracted lithium is subsequently reinserted electro-chemically, the voltage characteristics of the corresponding prior art insertion compounds are obtained.

Without wishing to be bound by theory, the observed similarities and differences between the prior art and the instant insertion compounds can be explained as follows. In Solid State Ionics, 62, 53 (1993), E. Rossen et al. demonstrate that compounds can have similar x-ray diffraction patterns yet different structures and electrochemical properties. In the instant case, the position of Mn and O atoms in the crystal lattice structure dictates the appearance of the x-ray diffraction pattern. X-rays are relatively insensitive to Li atoms (the scattering power of Mn is almost 70 times greater than that of Li). Therefore, x-ray diffraction gives essentially no information on the Li content nor the location of Li in the crystal structure.

On the other hand, the electrochemical potential of Li in the insertion compound is much more sensitive to the Li content and location of lithium therein. The voltage of the compound relative to Li/Li$_+$ is directly related to this electrochemical potential. Thus, small differences in the Li content or differences in the location of Li in the crystal structure can result in changes to the voltage characteristics of the compound without a significant change in the x-ray diffraction pattern.

Based on the preceding, the characteristics of such insertion compounds can clearly be quite sensitive to the details of the preparation. The instant insertion compounds comprise tetragonal Li$_x$Mn$_2$O$_4$ having a voltage relative to Li/Li$_+$ of about 3.2 V and compounds that are electrochemically derived therefrom. The Li$_x$Mn$_2$O$_4$ can be prepared using a precursor insertion compound that has the same stoichiometry and an orthorhombic crystal structure. This precursor insertion compound is known in the art and is commonly denoted as LiMnO$_2$. Powders of orthorhombic LiMnO$_2$ and a suitable lithium source are intimately mixed and then heated at a high soaking temperature (ie. above 150° C.) in an atmosphere substantially free of oxygen.

The best results to date have been achieved using Li$_2$CO$_3$ as the lithium source compound. However, it is expected that other sources, including Li vapour, can also be used successfully. As shown in the following Illustrative Example, LiOH has been used with partial success (the resulting product contained a substantial amount of an impurity phase). With $Li_2CO_3$ as the lithium source, satisfactory results can be obtained by ramping the temperature of the mixture at about 80° C./minute to a soaking temperature of about 1000° C. and then maintaining it for a period of about 1–2 hours. However, it is expected that a range of ramping rates, soaking temperatures, and soaking periods will also produce satisfactory results although this range may differ with the lithium source employed.

Preferably, the ratio of the lithium salt to the orthorhombic $LiMnO_2$ compound in the mixture is chosen such that the total moles of lithium in the mixture is in the range from about 1.25 to about 1.45 times the moles of Mn. Significant excess lithium is therefore preferably used in the preparation. However, the tetragonal product appears not to contain all the excess lithium itself. Unaccounted for lithium may be lost in the preparation, perhaps remaining on the vessel used to contain the powder mixture during heating. Alternately, some amount of unaccounted for lithium may reside on the surface of the product powder. However, no evidence of residual lithium compounds has been detected by x-ray diffraction in the Examples to follow.

Neither the orthorhombic $LiMnO_2$ nor the tetragonal $Li_xMn_2O_4$ are stable at high temperatures in the presence of oxygen. Thus, the atmosphere around the mixture must be substantially free of oxygen during the heating. By-product gases of the preparation include oxygen and carbon dioxide. A means for achieving the desired atmosphere and for flushing away the by-product gases comprises flowing inert gas (such as argon) over the mixture during the heating.

Insertion compounds of the invention may find practical use as a portion of the cathode material in rechargeable batteries, lithium ion types in particular. A variety of battery embodiments are possible. Miniature laboratory batteries employing a lithium metal anode are described in the examples to follow. However, preferred embodiments for lithium ion type systems include prismatic or spirally-wound type constructions. A commercially available spiral-wound type battery is depicted in the cross-sectional view of FIG. 1. A jelly roll 4 is created by spirally winding a cathode foil (not shown), an anode foil (not shown), and two microporous polyolefin sheets (not shown) that act as separators.

Cathode foils are prepared by applying a mixture of powdered lithium insertion compounds comprising the compound of the invention, other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that powdered carbonaceous material (typically partially graphitized carbon) is used instead of the cathode material and thin copper foil is usually used instead of aluminum. Anode foils are typically slightly wider than the cathode foils in order to ensure that anode foil is always opposite cathode foil. This feature is illustrated with the cathode upper edge 13, cathode lower edge 14, anode upper edge 12, and anode lower edge 15 depicted in FIG. 1.

The jelly roll 4 is inserted into a conventional battery can 3. A header 1 and gasket 20 are used to seal the battery 16. The header may include safety devices if desired. A combination safety vent and pressure operated disconnect device may be employed. FIG. 1 shows one such combination that is described in detail in Canadian Patent Application No. 2,099,657. Additionally, a positive thermal coefficient device (PTC) may be incorporated into the header to limit the short circuit current capability of the battery. The external surface of the header 1 is also used as the positive terminal, while the external surface of the can 3 serves as the negative terminal.

Appropriate cathode tab 5 and anode tab 6 connections are made to connect the internal electrodes to the external terminals. Appropriate insulating pieces 2 and 7 may be inserted to prevent the possibility of internal shorting. Prior to crimping the header 1 to the can 3 in order to seal the battery, non-aqueous electrolyte 8 is added to fill the porous spaces in the jelly roll 4.

Those skilled in the art will understand that the types of and amounts of the component materials must be chosen based on component material properties and the desired performance and safety requirements. For various reasons including cost, operating voltage, and safety, a preferred cathode material for use in lithium ion batteries is the spinel $Li_xMn_2O_4$ with x varying from about 0 to about 1 during operation. To optimize the capacity of such a battery, the ratio of the active cathode material to active anode material is carefully chosen. Hereinafter, this ratio will be referred to as the balance. In selecting the balance, consideration is given to the allowable voltage range of the components as a combination and to any irreversible processes that occur. Often the latter is a function of the electrolyte choice, further complicating matters for the battery engineer.

Figure 2A:
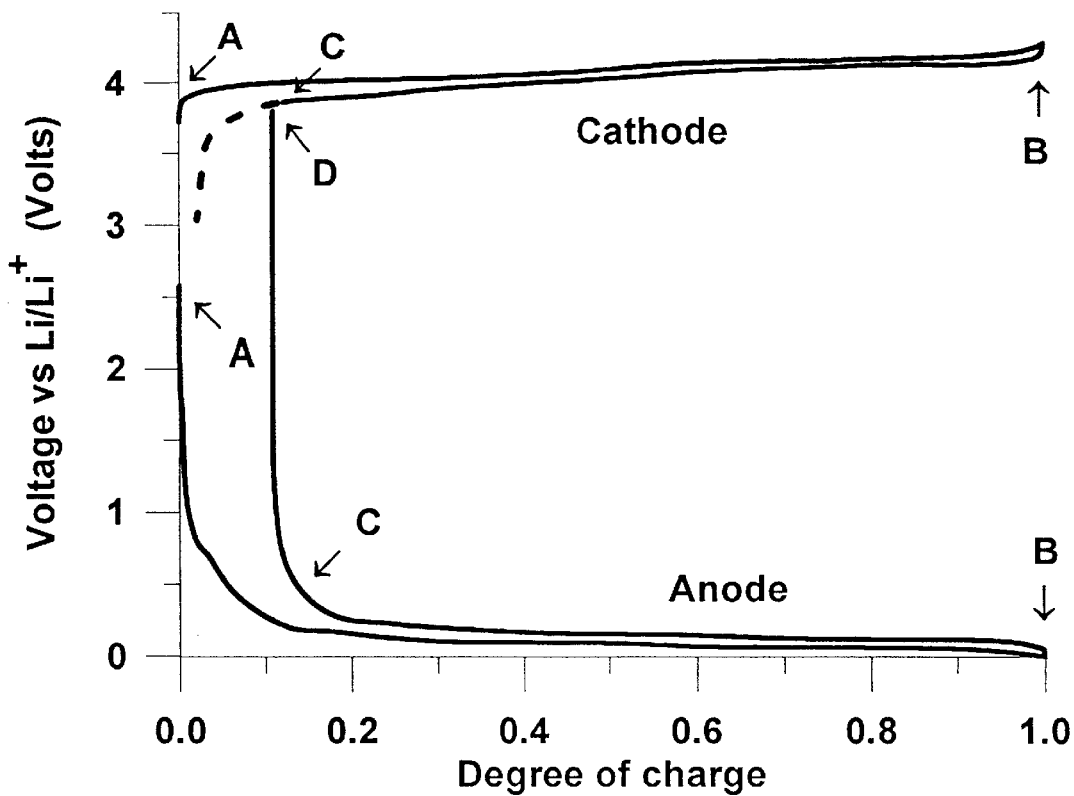
FIG. 2a illustrates the voltage profiles of the electrodes in a conventional lithium ion battery based on spinel Li$_x$Mn$_2$O$_4$ cathode material and graphitic anode material. Curves I and II show the voltage profiles for the cathode and anode respectively with respect to Li/Li$_+$. The overall battery voltage (ie. between the terminals) is given by the difference between these two curves.

The voltage profiles of the electrodes in one desirably balanced conventional battery based on spinel $Li_xMn_2O_4$ cathode material and graphitic anode material is shown in FIG. 2a. (Curves are shown for the individual voltage profiles for both the cathode and anode with respect to $Li/Li_+$.) The overall battery voltage (ie. between the terminals) is given by the difference between these two curves. Points A on each curve show each electrode voltage as assembled (the overall battery voltage being almost zero). On an initial full charge, the electrode voltages follow the respective curves to points B. During a normal subsequent discharge, the curves are then followed to a cutoff about points C (overall battery voltage of about 3 volts). However, continuing the discharge (overdischarge) results in a meeting of the curves at point D (overall battery voltage of zero). An irreversible loss of lithium insertion capacity is a characteristic of both cathode and anode as shown in FIG. 2a (ie. neither electrode can discharge as much lithium as was initially recharged). In this case, the relative loss on the anode is greater for the balance shown. This battery is considered to be anode limited, since the anode capacity is exhausted before the cathode capacity.

Generally, overdischarge is desirably avoided in commercial lithium ion batteries since copper foil is used in the anode which corrodes above about 3.7 V with respect to $Li/Li_+$. Overdischarge as in FIG. 2a then results in a degradation of the anode with a corresponding loss in capacity. A cathode limited battery can be engineered by altering the balance (ie. less anode) and using less of the available cathode capacity. However, such an approach results in a substantial capacity penalty.

Figure 2B:
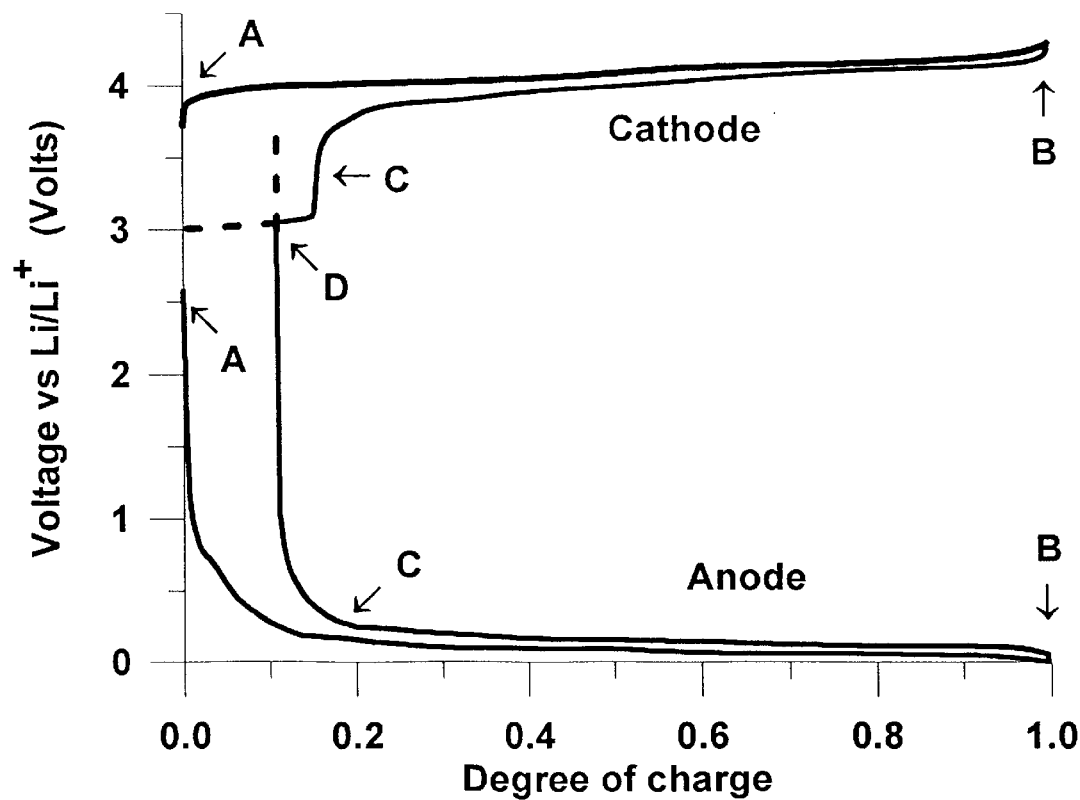
FIG. 2b shows the voltage profiles of the electrodes in a cathode limited embodiment of the invention.

Another way of engineering a cathode limited battery is by adding a small reservoir of additional lithium in the cathode thereby compensating for the excessive irreversible loss in the anode capacity. The insertion compounds of the invention are a particularly useful reservoir since it is air stable and it converts into spinel $Li_xMn_2O_4$ as well once sufficient lithium is extracted (on the initial charging of the battery). Choosing an appropriate amount of reservoir compound is relatively straightforward given the desired component choice and balance. FIG. 2b shows the voltage profiles of the electrodes in a cathode limited embodiment of the invention. The anode voltage therein is kept well below 3.7 V.

The examples to follow are useful in illustrating certain aspects of the invention but should not be construed as limiting the scope of the invention in any way.

A Philips powder diffractometer equipped with a Cu target x-ray tube and a diffracted beam monochrometer was used for the x-ray diffraction measurements. Hill and Howard's version (J. Appl. Crystallography, 18, 173 (1985)) of the Rietveld (J. Appl. Crystallography, 2, 65 (1969)) powder profile refinement software was used to quantitatively analyze the x-ray data. All x-ray measurements were made with the powders exposed to air.

Where indicated the stoichiometry of the samples was determined by combining information gleaned from three separate titrations. In the first of these, total Mn content was measured by potentiometric titration of an HCl digested sample with $KMnO_4$. In the second, the average Mn valance was determined from potentiometric titration of a $Fe^{2+}$ digested sample with $KMnO_4$. The amount of remaining unoxidized $Fe^{2+}$ then indirectly provides a measure of the average Mn valance in the original sample. In the third, the total cation charge ($Li_+$ and $Mn^{2+}$) in an HCl digested sample was measured using a proton ion exchange resin. The combination of the preceding data with the need for charge neutrality allows a complete determination of the relative stoichiometry. Fixing the oxygen content at 4.00 then results in the absolute stoichiometry indicated.

Figure 3:
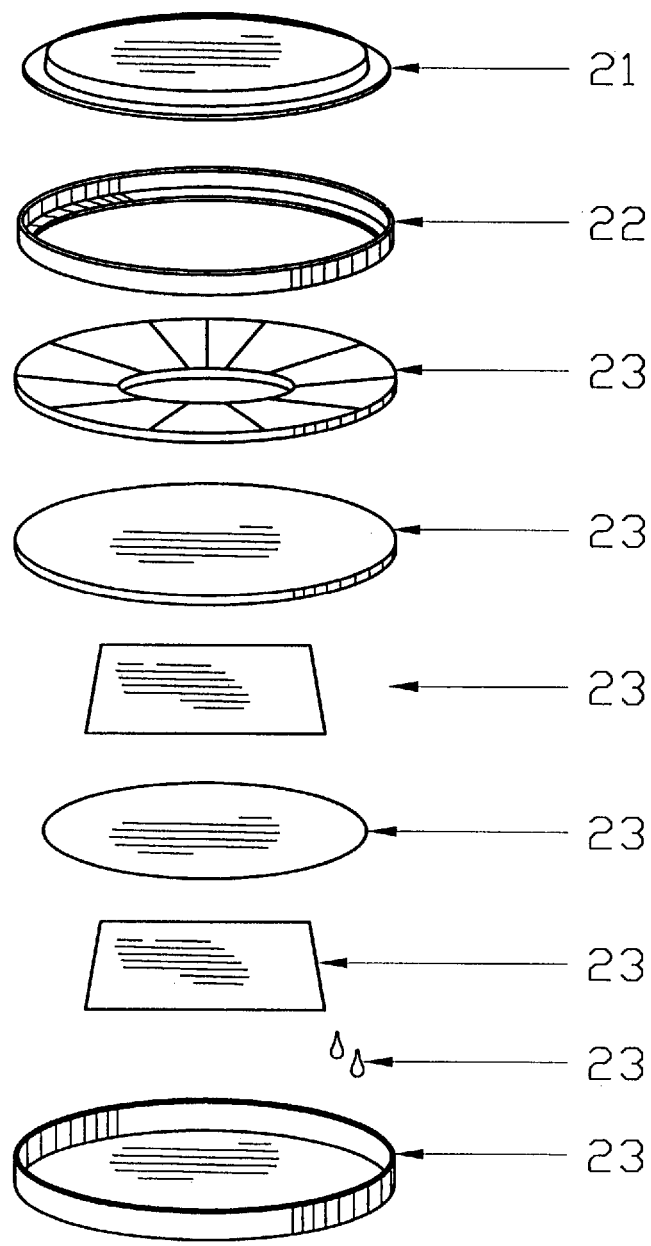
FIG. 3 depicts an exploded view of a laboratory coin cell battery used in the Examples.

A laboratory coin cell battery was used to determine electrochemical characteristics. This was assembled using conventional 2325 hardware and with assembly taking place in a dry room but otherwise as described in J. R. Dahn et al, Electrochimica Acta, 38, 1179 (1993). FIG. 3 shows an exploded view of the coin cell type battery. A stainless steel cap 21 and special oxidation resistant case 30 comprise the container and also serve as negative and positive terminals respectively. A gasket 22 is used as a seal and also serves to separate the two terminals. Mechanical pressure is applied to the stack comprising lithium anode 25, separator 26, and cathode 27 by means of mild steel disc spring 23 and stainless disc 24. The disc spring was selected such that a pressure of about 15 bar was applied following closure of the battery. 125 µm thick metal foil was used as a lithium anode 25. Celgard 2502 microporous polypropylene film was used as the separator 26. The electrolyte 28 was a solution of 1M $LiBF_4$ salt dissolved in a solvent mixture of DEC, PC and EC in a volume ratio of 50/20/30 respectively.

A cathodes 27 was made by uniformly coating a 20 µm thick aluminum foil substrate with a blend containing a mixture of Li—Mn—O powder, Super S carbon black conductive dilutant, and ethylene propylene diene monomer (EPDM) binder. This was accomplished by initially making a slurry containing cyclohexane solvent wherein the Li—Mn—O powder and carbon black mixture (88 and 10 parts by weight respectively) were added to an appropriate amount of binder solution containing 4% EPDM in cyclohexane, such that 2% of the final dried electrode mass would be EPDM. Excess cyclohexane was then added until the slurry viscosity was like that of a syrup, whereupon the slurry was then coated onto the foil using a doctor blade spreader. Cyclohexane was then evaporated away at room temperature in air. After drying, the electrode was compacted between flat plates at about 25 bar pressure. A disc cathode 27 of diameter 16.2 mm was then cut from this larger electrode using a precision cutting jig. The cathode 27 was then weighed and the active Li—Mn—O mass present was obtained by subtracting the weight of Al foil, EPDM, and carbon black present.

Coin cell batteries were thermostatted at 21°±1° C. before testing and were then charged and discharged using constant current cyclers with ±1% current stability. Current densities were adjusted to be 0.25 mA/cm². Data was logged whenever the cell voltage changed by more than 0.001 V.

INVENTIVE EXAMPLE 1

Figure 4:
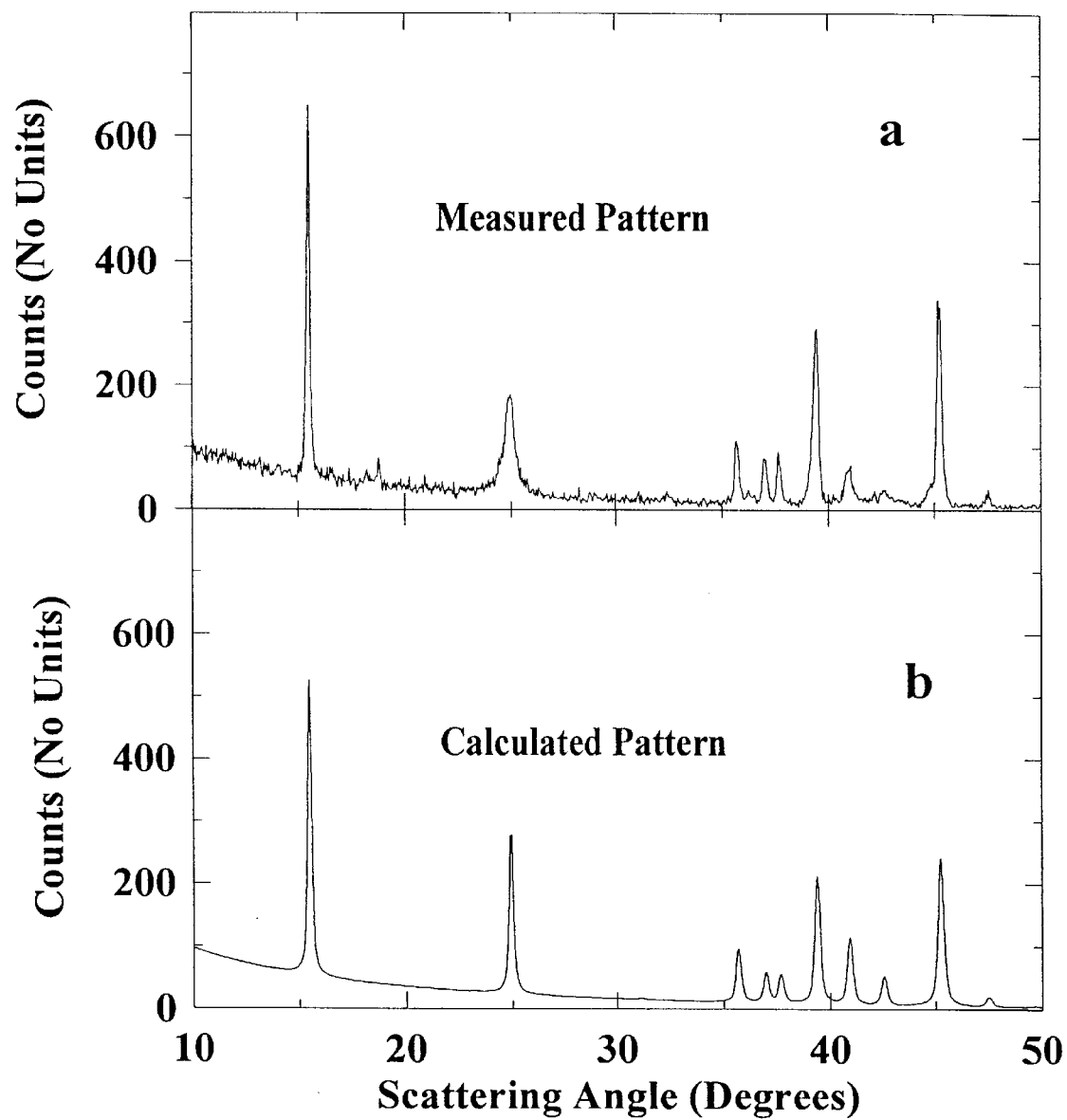
FIGS. 4a and b depict the x-ray diffraction pattern for the orthorhombic precursor product of Inventive Example 1' and the calculated pattern for orthorhombic LiMnO$_2$ respectively.

A 55 gram stoichiometric mixture of $Li_2CO_3$ (from FMC Corp.) and $MnO_2$ (TAD-2 grade EMD of Mitsui) was ground for 10 minutes and placed in a tube furnace. The mixture was then heated at 600° C. for 2 hours and then at 800° C. for 10 hours under a 2L/minute flow of argon gas. The heating rate in each case was 3° C./minute. The x-ray diffraction pattern of the product was determined and appears in FIG. 4a. The pattern matches that of the calculated pattern for orthorhombic $LiMnO_2$ shown in FIG. 4b.

Figure 5:
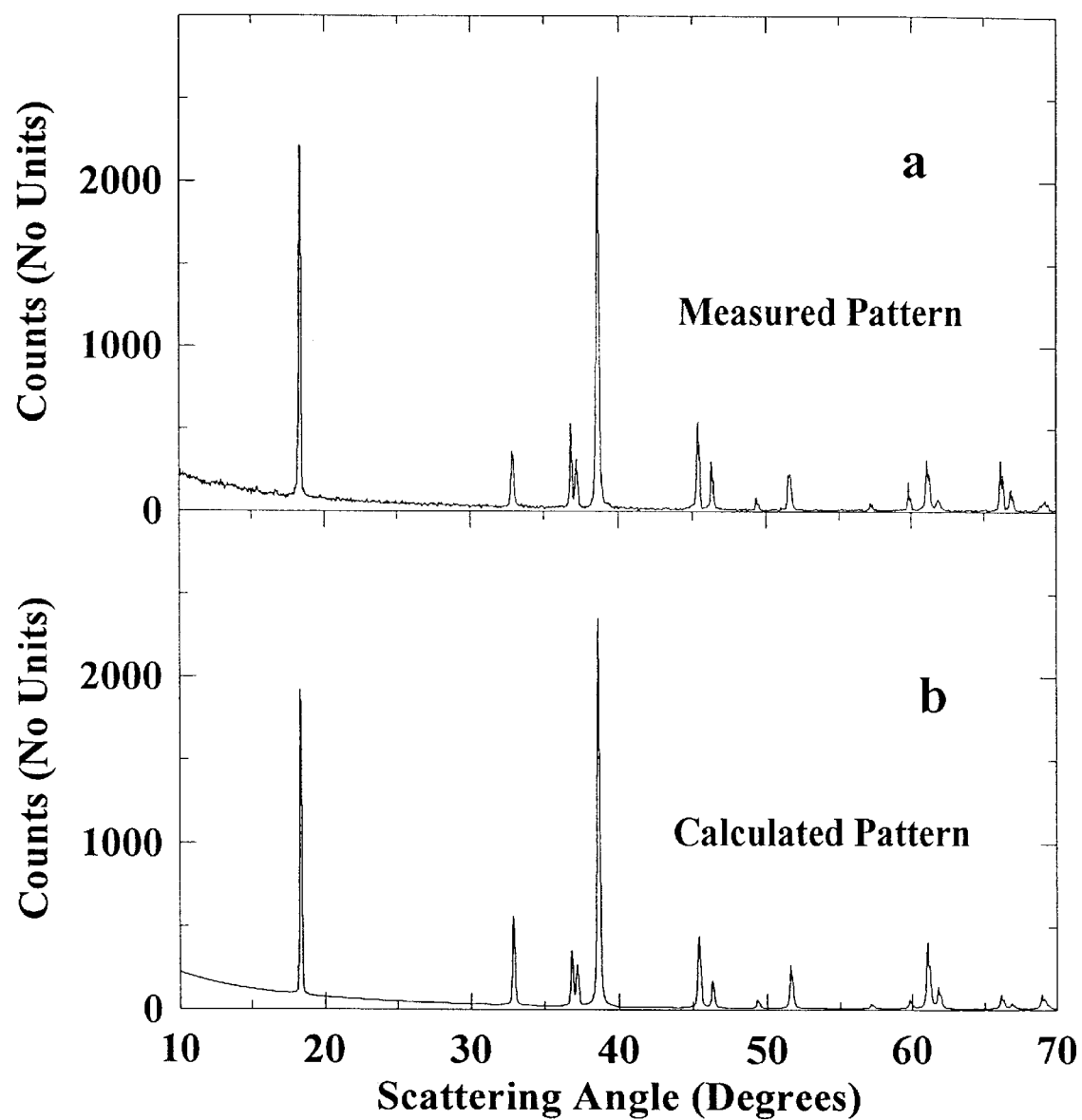
FIGS. 5a and b depict the x-ray diffraction pattern for the tetragonal product of Inventive Example 1 and the calculated pattern for tetragonal Li$_x$Mn$_2$O$_4$ respectively.

A 10 gram mixture of the synthesized orthorhombic $LiMnO_2$ and $Li_2CO_3$ in a mole ratio of 1 to 0.125 was ground for 10 minutes and placed in a tube furnace. The mixture was then heated at 1000° C. for ½ hour, allowed to cool to 800° C., and then allowed to cool outside the furnace under flowing argon gas. The heating rate was 80° C./minute and the cooling rate to 800° C. was 13° C./minute. The x-ray diffraction pattern of the product was determined and appears in FIG. 5a. The pattern matches that of the calculated pattern for tetragonal $Li_xMn_2O_4$ shown in FIG. 5b. The stoichiometry of the tetragonal sample was also determined by titration analysis and was found to be $Li_{2.095}Mn_{1.997}O_4$.

Figure 6A:
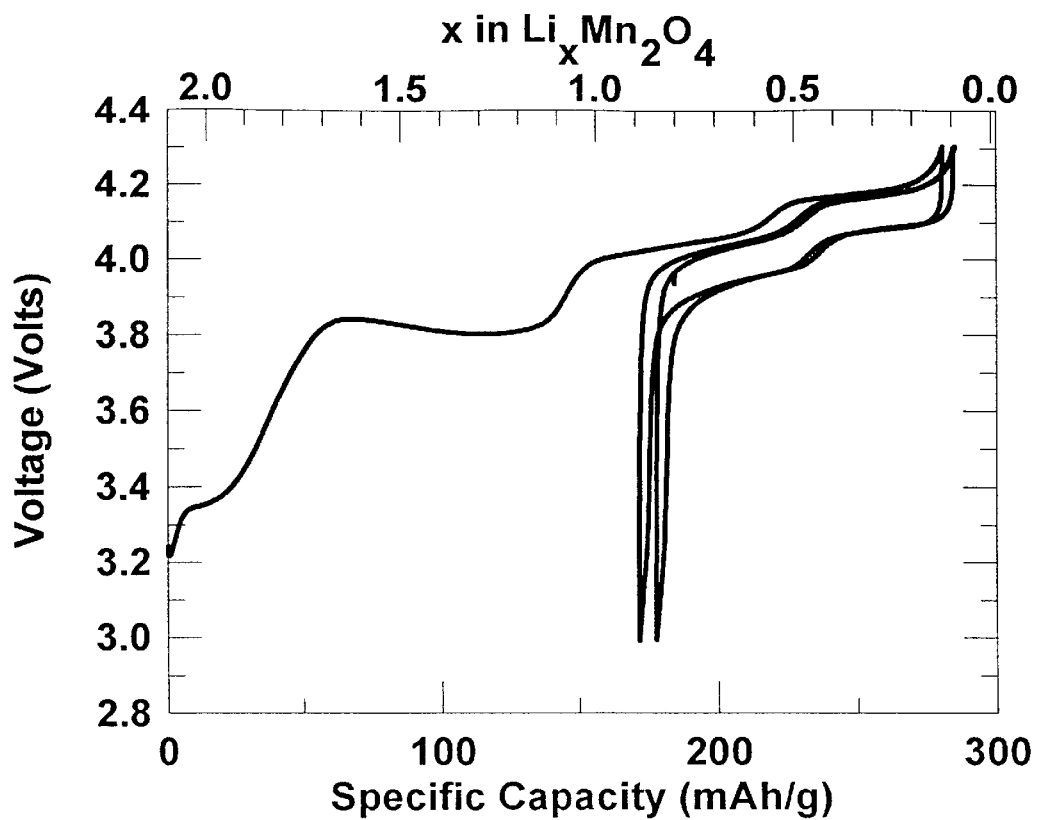
FIG. 6a depicts the voltage profile versus specific capacity for the first two cycles of the laboratory coin cell battery of Inventive Example 1.
Figure 6B:
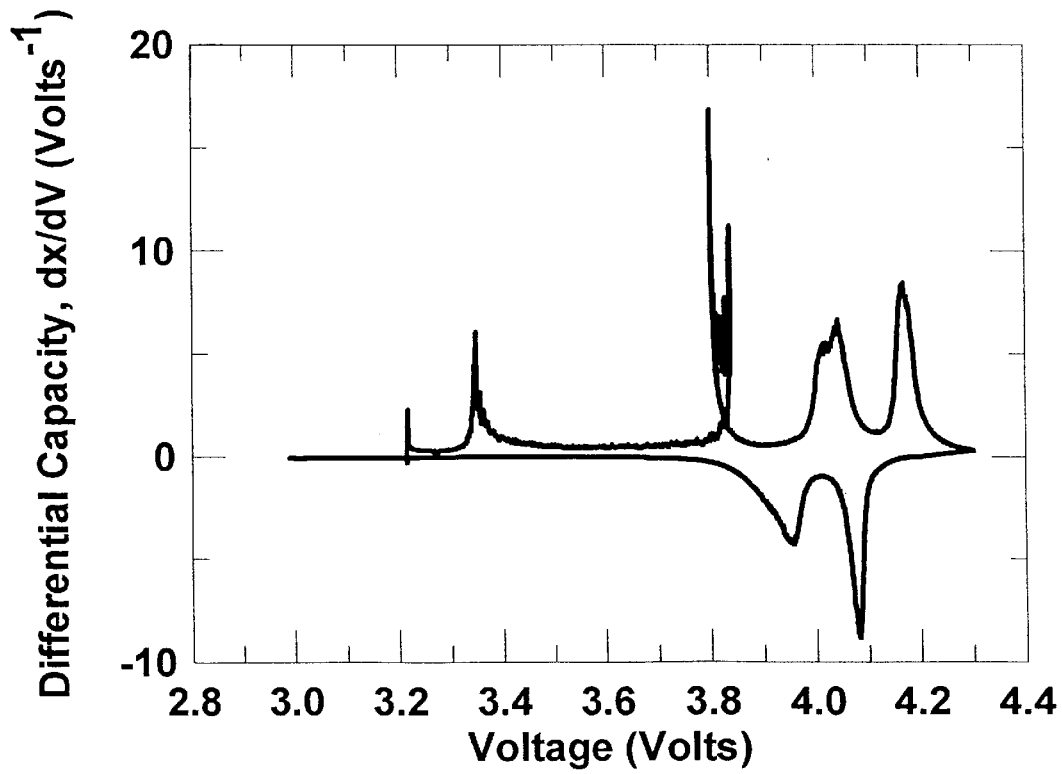
FIG. 6b depicts the differential capacity versus voltage for the first cycle only.

A laboratory coin cell battery employing a lithium metal anode was constructed as described in the preceding. The voltage profile versus specific capacity (capacity/per unit weight) for the first two cycles of this battery (cycling between 3 and 4.3 volts) is shown in FIG. 6a. A plot of the differential capacity (dx/dV) versus voltage for the first cycle of this battery is shown in FIG. 6b. The battery shows an open circuit voltage of over 3.2 volts. On charging, the voltage increases until it reaches about 3.8 volts at an x value corresponding to about 1.7. Thereafter, a plateau in the voltage profile is seen, indicative of a phase transition. (Note that there is a small drop in the battery voltage early on in the plateau. This may be the result of a slight initial overvoltage arising from nucleation kinetics.) After extracting lithium to an x value near zero, the insertion compound exhibits voltage characteristics similar to prior art spinel $LiMn_2O_4$.

The sample compound exhibits significant lithium capacity at voltages well in excess of 3.2 volts. Interpretation of the differential capacity curve in FIG. 6b is somewhat complicated by the drop in the plateau voltage. However, capacity peaks at about 3.8 volts and to a smaller extent at about 3.35 volts is seen. (In FIG. 6b, the curve goes backwards temporarily at the 3.8 volt peak as a result of the drop in plateau voltage. The negative portion of the dx/dV curve has been deleted for clarity.)

INVENTIVE EXAMPLE 2

A 100 g batch of tetragonal $Li_xMn_2O_4$ was synthesized in a manner similar to Inventive Example 1. Two conventional spirally-wound 4/3 A lithium ion batteries were then prepared as described in the preceding. In both batteries, the cathode comprised about 12.0 grams of lithium manganese oxide powders, the anode comprised about 4.6 grams of partially graphitized spherical carbon powder, and the electrolyte was 1.0M LiPF6 in a 30/70 (by volume) solvent mixture of ethylene carbonate and diethyl carbonate respectively. However, in one 4/3 A battery, the active cathode material was entirely prior art spinel LiMn$_2$O$_4$, while the other battery cathode material was 89% by weight prior art spinel LiMn$_2$O$_4$ and 11% by weight tetragonal Li$_x$Mn$_2$O$_4$ of this Example. The amount of additive in the latter was chosen such that the battery would be cathode limited on overdischarge. On the other hand, the construction of the former results in a battery that was anode limited on overdischarge.

Figure 7:
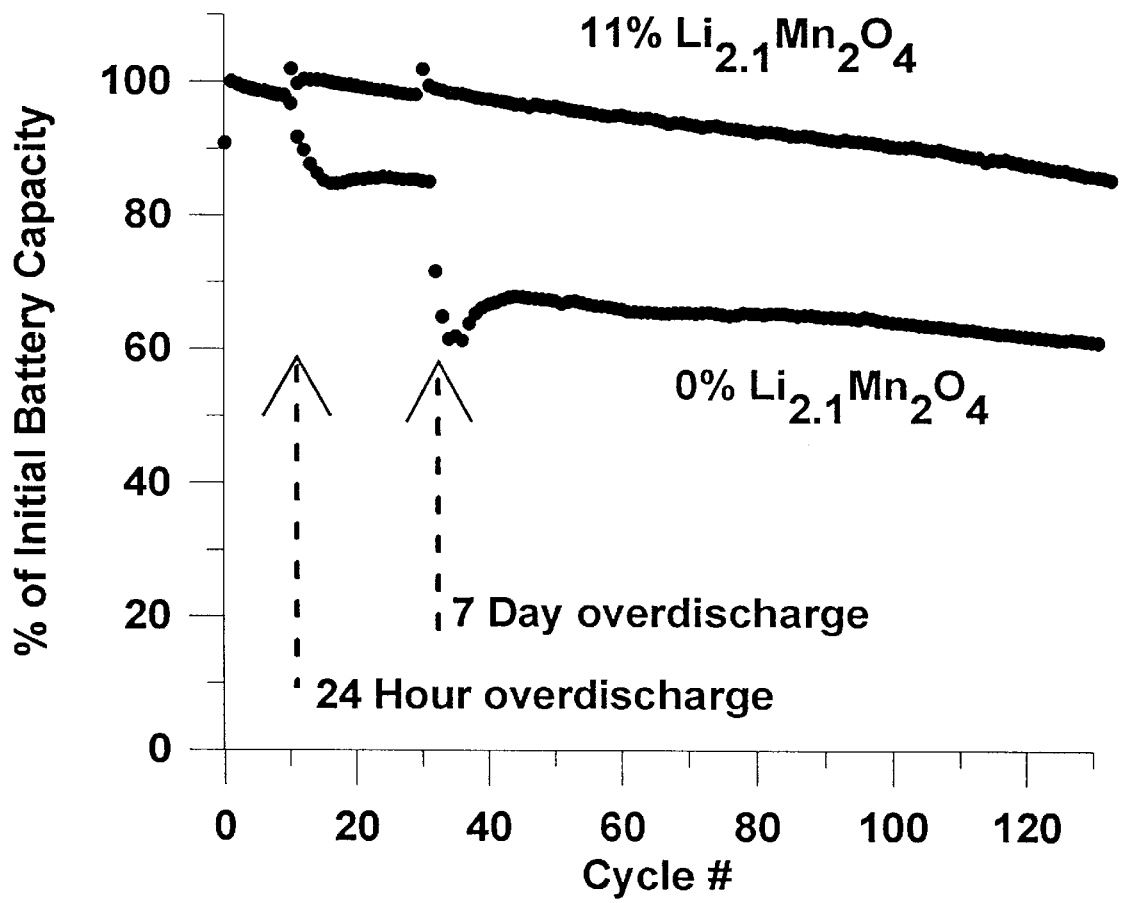
FIG. 7 shows the capacity versus cycle number for the inventive and conventional batteries of Inventive Example 2.

Both batteries were cycled at 21° C. with the discharge being at a constant 1 amp current and the recharge being at a current limited (to 1 amp) constant voltage between 3 and 4.2 volts. At cycle 10, each battery was overdischarged to zero volts by shorting each with a 2 ohm resistor for 24 hours. At cycle 30, each battery was overdischarged in a like manner for 7 days. FIG. 7 shows the capacity versus cycle number for both batteries. The conventional battery made with 100% prior art spinel LiMn$_2$O$_4$ cathode suffered considerable capacity loss after each overdischarge event. However, the battery comprising the tetragonal Li$_x$Mn$_2$O$_4$ cathode additive showed no such capacity loss.

ILLUSTRATIVE EXAMPLE

An attempt was made to prepare tetragonal Li$_x$Mn$_2$O$_4$ as in Inventive Example 1 except LiOH was used as the lithium source compound. A 10 gram mixture of the synthesized orthorhombic LiMnO$_2$ and LiOH in a mole ratio of 1 to 0.25 was ground for 10 minutes and placed in a tube furnace. The mixture was then heated at 1000° C. for 2 hours, allowed to cool to 800° C., and then allowed to cool outside the furnace under flowing argon gas. The heating rate was 80° C./minute and the cooling rate to 800° C. was 13° C./minute The product appeared to be a phase mixture estimated (based on x-ray diffraction and electrochemical measurements) as about ⅓ prior art Li$_2$Mn$_2$O$_4$ and ⅔ tetragonal Li$_x$Mn$_2$O$_4$ as in Inventive Example 1. (X-ray diffraction cannot distinguish these two phases, but can distinguish most others. The electrochemical characteristics, ie. the voltage behaviour in a laboratory coin cell battery, indicate the presence of the two phases.)

Thus, it is possible to prepare insertion compounds of the invention with partial success using LiOH as the lithium source compound. (However, a substantial amount of 'impurity', the prior art, was formed as well in this example.)

As will be apparent to those skilled in the art in light of the foregoing disclosure, many alterations and modifications are possible in the practice of this invention without departing from the spirit or scope thereof. For example, similar predictable benefits might be expected for a variety of anode and/or electrolyte combinations other than those mentioned in Inventive Example 1. Accordingly, the scope of the invention is to be construed in accordance with the substance defined by the following claims.

What is claimed is:

1. An insertion compound having the formula Li$_x$Mn$_2$O$_4$ and a tetragonal crystal structure wherein x is a number in the range from about 1.7 to about 2.1 said insertion compound having a voltage relative to Li/Li$^+$ in the range from about 3.2 to about 3.8 V.

2. An insertion compound as claimed in claim 1 wherein x is about 2.1 and the voltage is about 3.2 V.

3. An insertion compound as claimed in claim 1 wherein x is about 1.7 and the voltage is about 3.8 V.

4. An insertion compound as claimed in claim 3 wherein the insertion compound undergoes a phase transition at about 3.8 volts versus Li/Li$^+$ when lithium is extracted electrochemically to form a spinel compound having a cubic crystal structure.

5. A method of preparing an insertion compound having the formula Li$_{2.1}$Mn$_2$O$_4$ having a voltage relative to Li/Li$^+$ of about 3.2 V, comprising the following steps:
 (a) mixing a LiMnO$_2$ compound with an orthorhombic crystal structure and a lithium source; and
 (b) heating the LiMnO$_2$ compound and lithium source mixture at a soaking temperature above 150° C. in an atmosphere substantially free of oxygen.

6. A method of preparing an insertion compound as claimed in claim 5 wherein the lithium source is Li$_2$CO$_3$.

7. A method of preparing an insertion compound as claimed in claim 5 wherein the ratio of the lithium source to the LiMnO$_2$ compound in the mixture is chosen such that the total moles of lithium in the mixture is in the range from about 1.25 to about 1.45 times the moles of Mn.

8. A method of preparing an insertion compound as claimed in claim 5 wherein the soaking temperature is about 1000° C.

9. A method of preparing an insertion compound as claimed in claim 8 wherein the soaking temperature is attained by ramping the temperature of the mixture at about 80° C./minute.

10. A method of preparing an insertion compound as claimed in claim 8 wherein the soaking temperature is maintained for about 1 to 2 hours.

11. A method of preparing an insertion compound as claimed in claim 5 wherein the atmosphere is provided by flowing inert gas over the mixture during the heating.

12. A method of preparing an insertion compound having the formula Li$_x$Mn$_2$O$_4$, x being a number in the range from about 1.7 to about 2.1 and the insertion compound having a voltage relative to Li/Li$^+$ from about 3.2 to about 3.8 V, comprising the following steps:
 (a) mixing a LiMnO$_2$ compound with an orthorhombic crystal structure and a lithium salt;
 (b) heating the LiMnO$_2$ and lithium salt mixture at a soaking temperature above 150° C. in at atmosphere substantially free of oxygen; and
 (c) electrochemically extracting lithium from the insertion compound.

13. An insertion compound prepared by the method as claimed in claim 5.

14. An insertion compound prepared by the method as claimed in claim 12.

15. A rechargeable battery comprising an anode, an electrolyte, and a cathode wherein a portion of the cathode comprises the insertion compound as claimed in claim 13, or 14.

16. A rechargeable battery as claimed in claim 15 wherein the cathode additionally comprises a lithium transition metal oxide insertion compound.

17. A rechargeable battery as claimed in claim 16 wherein the lithium transition metal oxide compound is a lithium manganese oxide spinel insertion compound.

18. A rechargeable battery as claimed in claim 16 wherein the battery is cathode limited on discharge.

19. A rechargeable battery as claimed in claim 18 wherein the anode comprises a lithium insertion compound and the electrolyte comprises a lithium salt dissolved in nonaqueous solvents.

20. A rechargeable battery as claimed in claim 19 wherein the anode additionally comprises a copper current collector.

* * * * *

UNITED STATES PATENT AND TRADEMARK OFFICE
CERTIFICATE OF CORRECTION

PATENT NO. : 5,882,218
DATED : March 16, 1999
INVENTOR(S) : Reimers

It is certified that error appears in the above-indentified patent and that said Letters Patent is hereby corrected as shown below:

Column 2, line 58, change "Li/Li$_+$" to -- Li/Li$^+$ --.

Column 2, line 60, change "Li/Li$_+$" to -- Li/Li$^+$ --.

Column 2, line 61, change "Li/Li$_+$" to -- Li/Li$^+$ --.

Column 2, line 64, change "Li/Li$_+$" to -- Li/Li$^+$ --.

Column 3, line 2, change "Li/Li$_+$" to -- Li/Li$^+$ --.

Column 3, line 54, change "Li/Li$_+$" to -- Li/Li$^+$ --.

Column 4, line 17, change "Li/Li$_+$" to -- Li/Li$^+$ --.

Column 4, line 20, change "Li/Li$_+$" to -- Li/Li$^+$ --.

Column 4, line 24, change "Li/Li$_+$" to -- Li/Li$^+$ --.

Column 4, line 46, change "Li/Li$_+$" to -- Li/Li$^+$ --.

Column 4, line 56, change "Li/Li$_+$" to -- Li/Li$^+$ --.

UNITED STATES PATENT AND TRADEMARK OFFICE
CERTIFICATE OF CORRECTION

PATENT NO. : 5,882,218
DATED : March 16, 1999
INVENTOR(S) : Reimers

It is certified that error appears in the above-indentified patent and that said Letters Patent is hereby corrected as shown below:

Column 4, line 66, delete "compound."

Column 6, line 40, change "Li/Li$_+$" to - - Li/Li$^+$ - -.

Column 6, line 60, change "Li/Li$_-$" to - - Li/Li$^+$ - -.

Column 7, line 32, change "Li/Li$_+$" to - - (Li$^+$

Signed and Sealed this

Twenty-sixth Day of October, 1999

Q. TODD DICKINSON

*Attest:*

*Attesting Officer*  Acting Commissioner of Patents and Trademarks